United States Patent
Montoya

(10) Patent No.: US 6,797,212 B2
(45) Date of Patent: Sep. 28, 2004

(54) METHOD FOR FORMING HOLLOW FIBERS

(75) Inventor: Jean Patrick Montoya, Ann Arbor, MI (US)

(73) Assignee: MedArray, Inc., Ann Arbor, MI (US)

( * ) Notice: Subject to any disclaimer, the term of this patent is extended or adjusted under 35 U.S.C. 154(b) by 0 days.

(21) Appl. No.: 10/414,777

(22) Filed: Apr. 16, 2003

(65) Prior Publication Data

US 2003/0197308 A1 Oct. 23, 2003

Related U.S. Application Data

(60) Provisional application No. 60/373,393, filed on Apr. 18, 2002.

(51) Int. Cl.[7] .......................... B29C 33/52; B29C 47/02
(52) U.S. Cl. ........................ 264/139; 264/149; 264/150; 264/171.12; 264/171.13; 264/209.6; 264/236; 264/317; 264/331.12
(58) Field of Search ............................... 264/139, 148, 264/149, 150, 171.12, 171.13, 209.6, 236, 317, 331.12

(56) References Cited

U.S. PATENT DOCUMENTS

| | | | |
|---|---|---|---|
| 3,445,321 A | 5/1969 | Groves | 161/92 |
| 3,794,468 A | 2/1974 | Leonard | 23/258.5 |
| 4,022,692 A | 5/1977 | Janneck | 210/321 B |
| 4,213,858 A | 7/1980 | Boberg et al. | 210/23 R |
| 4,670,313 A | 6/1987 | Saudagar | 428/12 |
| 4,690,844 A | 9/1987 | Saudagar | 428/36 |
| 4,911,846 A | 3/1990 | Akasu et al. | 210/645 |
| 4,957,508 A | 9/1990 | Kaneko et al. | 623/12 |
| 5,002,666 A | 3/1991 | Matsumoto et al. | 210/321.61 |
| 5,043,140 A | 8/1991 | Combs | 422/46 |
| 5,162,101 A | 11/1992 | Cosentino et al. | 422/46 |
| 5,171,735 A | 12/1992 | Chien | 505/1 |
| 5,188,801 A | 2/1993 | Fini | 422/48 |
| 5,192,320 A | 3/1993 | Anazawa et al. | 623/12 |
| 5,230,862 A | 7/1993 | Berry et al. | 422/48 |
| 5,297,591 A | 3/1994 | Baurmeister | 139/383 |
| 5,312,589 A | 5/1994 | Reeder et al. | 422/45 |
| 5,445,771 A | 8/1995 | Degen | 264/22 |
| 5,489,413 A | 2/1996 | Carson et al. | 422/46 |
| 5,565,166 A | 10/1996 | Witzko et al. | 264/565 |
| 5,637,224 A | 6/1997 | Sirkar et al. | 210/644 |
| 5,698,161 A | 12/1997 | Montoya | 422/48 |

FOREIGN PATENT DOCUMENTS

| | | |
|---|---|---|
| JP | 3-30889 | 2/1991 |
| JP | 3-135422 A2 | 6/1991 |

*Primary Examiner*—Stefan Staicovici
(74) *Attorney, Agent, or Firm*—Gifford, Krass, Groh, Sprinkle, Anderson & Citkowski, PC

(57) ABSTRACT

A thin walled microtube is formed by providing a continuous elongated member having an outer surface. The member is at least partially formed of a water soluble material. A coating material is provided. The coating material may be a silicone compound that is curable such that the coating material cures into a substantial non-porous silicone. The outer surface of the elongated member is coated with a coating material so as to form a substantially uniform and continuous layer of coating material on the outer surface. The layer of coating material is cured so as to form a substantial uniform and continuous layer of substantially non-porous silicone on the outer surface. The elongated member is at least partially dissolved using water and purged from the silicone layer, such that an elongated tube of substantially non-porous silicone is formed.

51 Claims, 4 Drawing Sheets

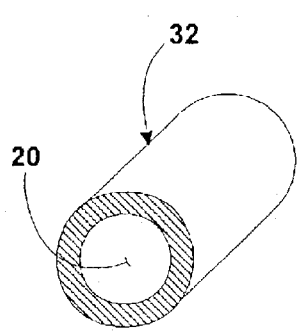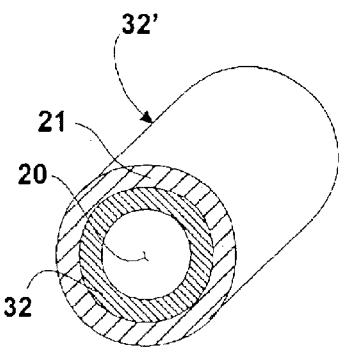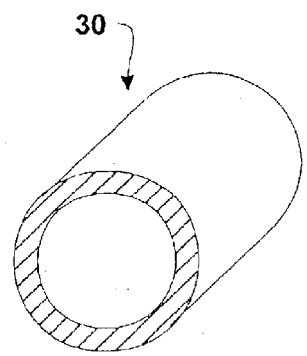
FIG. 2a   FIG. 2b   FIG. 2c
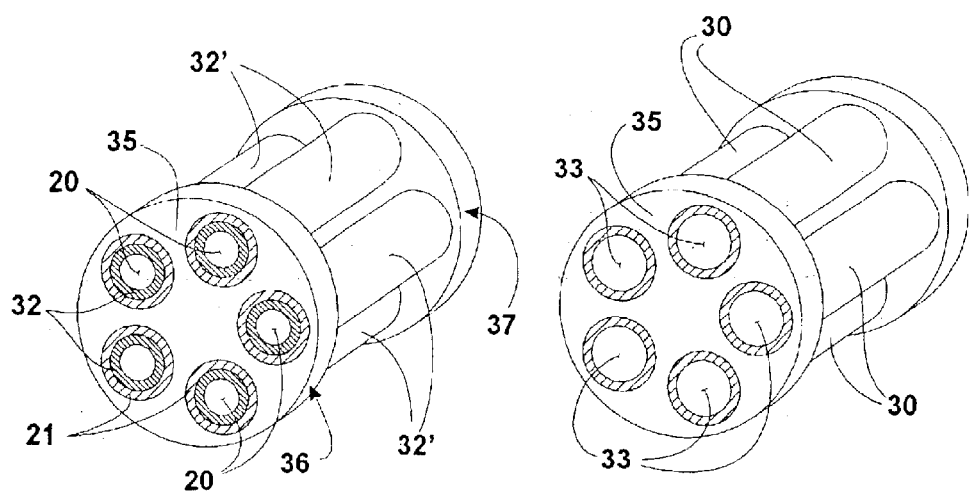
FIG. 3a   FIG. 3b

METHOD FOR FORMING HOLLOW FIBERS

CROSS-REFERENCE TO RELATED APPLICATION

This application claims priority from U.S. Provisional Patent application U.S. Ser. No. 60/373,393, filed Apr. 18, 2002, the entire content of which is incorporated herein by reference.

STATEMENT REGARDING FEDERALLY SPONSORED RESEARCH OR DEVELOPMENT

This invention was made in part with Government support under SBIR Grant No. R43-HL68375-01 awarded by the PHS. The Government may have certain rights in the invention.

FIELD OF THE INVENTION

The present invention generally relates to a method for forming hollow fibers.

DESCRIPTION OF THE RELATED ART

Artificial gas exchange to and from biological fluids is widely performed in the clinical settings as well as in the laboratory for research purposes. In the clinical setting the use of blood oxygenators during extracorporeal life support (ECLS), is commonly used to replace or aid in the function of the lungs during heart surgery, or long-term cardiorespiratory support. Gas exchange is accomplished by creating a diffusion potential across a gas permeable membrane that drives a transfer of gas from a high partial pressure on one side, to a low partial pressure on the other side of the membrane, as provided by Fick's law of diffusion:

$$\dot{m}_g = K \frac{A}{t} (p_g^1 - p_g^2)$$

where $\dot{m}_g$ is the rate of gas mass transfer across the membrane, K is a factor that is proportional to the solubility of the gas in the membrane and to the membrane diffusion coefficient, A is the membrane surface area, t is the membrane thickness and $p_g$ is the gas partial pressure on either side of the membrane. This equation suggests that for a given partial pressure difference across a membrane, more gas transfer is accomplished by increasing the membrane surface area, and by decreasing the membrane thickness.

Blood oxygenating devices that make use of gas transfer across a membrane come in a variety of styles. One design makes use of microporous membrane hollow fibers (MMHF). Microporous membrane hollow fibers are very small hollow tubes, with a typical outer diameter between 250 and 380 microns ($\mu$m) and a typical wall thickness of about 50 microns ($\mu$m). Multiple microporous membrane hollow fibers are typically wound into a fiber bundle, using a desired weaving pattern among the fibers. A typical fiber bundle constructed of microporous membrane hollow fibers is shown at 10 in FIG. 1. The individual fibers 12 forming the bundle 10 are illustrated with a greatly exaggerated diameter and wall thickness.

Blood oxygenating devices utilizing microporous membrane hollow fibers have become common for use during short-term cardiorespiratory support for procedures, such as routine bypass operations. In such a device, the ends 14 and 16 of the bundle 10 are each firmly potted into a potting material, which interconnects and seals to the ends of the fibers 12. A portion of the potting material is then sliced off so as to expose the hollow lumens 18 of each of the fibers 12. The potting material serves to interconnect and seal the outer surfaces of each of the fibers so that they are manifolded together at both ends. The potted bundle is then positioned in the oxygenator housing such that gas may be introduced into the lumens 18 while blood is passed over the outer surfaces of the fibers. Then, as oxygen flows inside the hollow fibers and blood flows over the outside of the fibers, the blood picks up oxygen and releases carbon dioxide across the microporous membrane, by diffusion.

In the fiber bundle, the walls of each fiber act as gas exchange membrane. Therefore, it is possible to compress a large membrane surface area into a relatively compact volume. In addition, as the blood flows outside the fibers, an increased convective mixing is achieved since the fibers downstream are within the wake or "eddies" of those upstream. In this description, "membrane hollow fibers" refers to hollow fibers where the walls of the hollow fibers act as membranes, and are typically thin to facilitate the transfer of mass and energy across the walls.

Microporous membrane hollow fibers are notorious for suffering from fowling and plasma leakage when they are used for extended periods of time: The blood plasma eventually leaks through the pores, thus compromising gas exchange, or rendering it completely ineffective.

Manufacturers of microporous membrane hollow fibers are incessantly seeking solutions to the plasma leakage problem, such as developing smaller pore size membranes that presumably have lower incidence of plasma leakage. Yet, no reports have been published showing improvement. Mitsubishi Rayon (Tokyo, Japan) introduced a multi-layered composite hollow fiber membrane (MHF) that contains a polyurethane interlayer sandwiched between two microporous polyethylene supporting layers. However, polyurethane has poor gas transfer properties, and fowling can still occur on the microporous side exposed to blood. There have been a number of other attempts to add dense coatings over microporous hollow fibers, yet none are available commercially. Notwithstanding the commercial availability of coated microporous membrane hollow fibers, the gas transfer through microporous membranes coated with silicone is reduced compared to the microporous membrane alone; gas must diffuse through the solid membrane in addition to the microporous membrane. Therefore, the tradeoff is reduced gas transfer.

Yet another potential problem associated with microporous membrane hollow fibers oxygenators is that if the gas side pressure becomes higher than the blood side, air can be readily transmitted through the micropores into the blood. Gas embolization may have fatal consequences if the gas bubbles are pumped into the patient. This can occur if the ports designed to vent the gas to atmosphere become occluded or if water condensation accumulates inside the lumen of the fibers, thus plugging the exhaust of oxygen. Consequently, gas side pressure must always be below the blood pressure to prevent gas embolization.

Because of the plasma leakage problem with microporous membrane hollow fibers oxygenators, spiral coil silicone membrane lungs (Medtronic Perfusion Systems, Brooklyn Park, Minn.), also known as Kolobow oxygenators, are used in long term applications because they do not have a propensity for plasma leakage. However, these solid membrane oxygenators require almost twice the surface area to achieve the same gas exchange as microporous hollow fibers. This is not because the membranes are not microporous, but because of the lack of convective mixing achievable over relatively "flat" membranes, compared to the mixing achievable over a bundle of thousands of hollow fibers. It should be noted that the oxygenated blood boundary layer, and not the membrane itself presents the major obstacle to oxygen diffusion to the blood.

A possible solution to the leakage problem with microporous membrane hollow fibers is to instead form hollow fibers out of a material that is not microporous, such as silicone. Gas diffusion can still occur across a silicone membrane, without the risk of gas embolization and plasma leakage. However, manufacture of blood oxygenators using silicone hollow fibers has not been commercially realistic.

Small silicone fibers can be extruded by polymer extruders in sizes comparable to the microporous polypropylene fibers. However, with the prior art there are two major barriers to the development of practical gas exchange devices. First, extrusion of solid silicone fibers is much more difficult and slower than extruding microporous polypropylene hollow fibers. Polypropylene is a thermoplastic polymer, whereas silicone is a cross-linked thermoset polymer. This means that polypropylene can be heated up, melted, and drawn-down to small diameters by pulling the extrudate as it comes out of the die, similar to making micropipettes with molten glass tubes. This allows for a significant reduction of fiber diameter from a manageable size die. Moreover, the polymer can be cooled quickly by water quenching once the fiber has been appropriately sized. Additional proprietary stretching processes are applied to render the fiber microporous.

Silicone, on the other hand, starts out as clay-like material that is extruded cold through the die (still as a clay) and then is heated to cure or cross-link the polymer, with much more limited drawdown compared to thermoplastics. Moreover, the clay like material has very little strength and is not as forgiving as molten plastic. As a result, the extrudate must be cross-linked or vulcanized quickly in order to control the tiny fiber. Thus, silicone extrusion is significantly slower than that of polypropylene to allow for polymer cure and subsequent handling such as winding in spools and fiber bundles. Further complicating the extrusion of tiny silicone fibers is the significant static buildup as the fiber cures through the oven. The static electricity makes it difficult to handle and wind the silicone fibers, especially if multiple fibers are extruded simultaneously.

The difficulty and the time-consuming process necessary to produce tiny silicone fibers are reflected in the product pricing. The price in 2002 for extruding one meter of silicone fiber (350 $\mu$m OD, 250 $\mu$m ID) was 33 cents, or $333 per kilometer (Specialty Manufacturing, Midland, Mich.). This compares to the microporous polypropylene hollow fiber price of $16 per kilometer (Celgard X30 240, Hoechst Celanese, Charlotte, N.C.). Thus the cost of the silicone fibers alone required for a device with 2.5 m$^2$ of diffusion surface area could cost as much as $750.

Secondly, manufacturing oxygenators with silicone fibers is also significantly more difficult than with microporous membrane hollow fibers because silicone is elastic and flimsy. The winding of the fiber bundle becomes much more challenging and thus significantly slower. Moreover, potting the fiber bundle is not easy since the elastic silicone fibers tend to deform as the fiber bundle is subjected to large forces during centrifuging. Manufacturing of silicone fiber oxygenators is not impossible, but very difficult and therefore prohibitively expensive.

In view of the forgoing limitations and shortcomings of the prior art, as well as other disadvantages not specifically mentioned above, it should be apparent that there exists a need in the art for an improved gas permeable hollow fiber.

BRIEF SUMMARY OF THE INVENTION

The present invention overcomes many of the shortcomings of the prior art by providing a method for producing a membrane hollow fiber which is not susceptible to plasma leakage and gas embolization. According to the present invention, a thin-walled microtube is formed by providing a continuous elongated member having an outer surface. The elongated member is at least partially formed of a water soluble material. A coating material is then provided, with the coating material being a silicone compound. The silicone structure is curable so as to form a substantially non-porous silicone. The outer surface of the elongated member is coated with the coating material so as to form a substantially uniform and continuous layer on the outer surface of the elongated member. The layer of coating material is then cured, and the elongated member is dissolved and purged from the layer of coating material. This leaves a micro tube formed of silicone. According to a further aspect of the present invention, the microtube formed according to the present invention may be assembled into a bundle and potted into a potting material at its ends prior to dissolving and purging the elongated member contained therein. After the fiber bundle is formed and potted, the elongated members in each of the microtubes may be dissolved and purged.

BRIEF DESCRIPTION OF DRAWINGS

FIG. 2a is a perspective view of a portion of a first fiber to be coated according to the present invention;

FIG. 2b is a perspective view of the fiber of FIG. 2a with a coating formed thereon;

FIG. 2c is a perspective view of a portion of a microtube formed after the first fiber of FIG. 2a is dissolved and purged from the coating of FIG. 2b;

FIG. 3a is a perspective view of a portion of a gas exchange device formed by potting the ends of coated fibers;

FIG. 3b is a perspective of a portion of the gas exchange device of FIG. 3a, with the first fibers dissolved and purged so as to leave a plurality of microtubes;

DETAILED DESCRIPTION OF THE INVENTION

Figure 1:
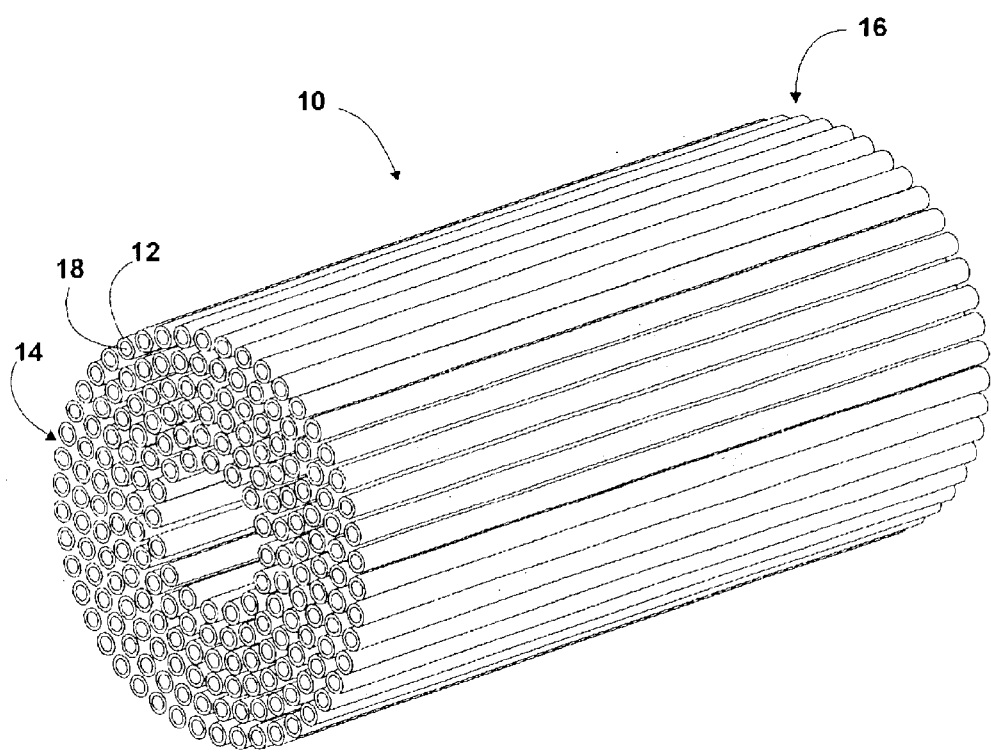
FIG. 1 is an enlarged perspective view of a prior art microporous membrane hollow fiber bundle with the fibers oriented in a parallel fashion.

Referring to FIGS. 2a–2c a method of constructing a silicone membrane hollow fiber embodying the principles of the present invention will be discussed.

It should be noted that alternate processes could be used to construct hollow fibers in different materials with different mass transfer properties, heat transfer properties, and any property desired in the membrane material, without departing from the principles of the present invention.

The first step in constructing a silicone membrane hollow fiber or microtube 30 involves the formation a first fiber or member first material, preferably a water-soluble polymer such as polyvinyl-alcohol (PVA). PVA is a non-toxic and environmentally safe polymer that is easily extruded much like polypropylene, and can be engineered to dissolve in water at any desired temperature. Other materials may also be used. It is preferred that they be water-soluble, such that they dissolved or partially dissolve when exposed to water. Preferably, hot water or steam is used for dissolving the materials. The materials may only partially dissolve, with parts of the material remaining solid or in a gel form. For purposes of the present invention, "water soluble" is defined as material that is sufficiently transformable from its solid state that it can be used in accordance with the present invention. In some embodiments, the material may have reinforcing fibers or non-soluble portions to adjust the physical characteristics of the first member 32. Referring to FIG. 2a, the PVA fiber 32 is preferably extruded hollow having an outside diameter of about 25 to 400 $\mu$m (microns). The hollow fiber or member 32 preferably has a wall thickness between 5 and 100 microns. Alternatively, the member 32 may be solid. It may also have cross-sections other than cicular. For example, it may have an oval or square cross-section. As shown, it is preferred that the member 32 be a continuous elongated member when the outer surface is not interrupted by any side branches or portions extending therefrom. In the embodiment wherein the outer surface is generally cylindrical, it may be said that the fiber has a central axis and all portions of the outer surface are equally distant from the central axis. The PVA fiber 32 can be manufactured by any well-known method including, but not limited to molding and extrusion.

Next, as illustrated in FIG. 2b, the PVA fiber 32 is uniformly coated with a thin layer of about 5 to 100 $\mu$m of a second material, in this case silicone elastomer compound, to form a coated fiber 32' having a coating 21 over the surface on the underlying fiber 32. Once the PVA fiber is coated with silicone, depending on the silicone compound, the coated fiber 32' may be heated to cure the silicone coating 21 over the PVA fiber 32. Other coating materials may require different processing to render them as desired in the final membrane. In each case, the processing necessary to convert the silicone coating to a silicone compound is referred to as curing, herein. After curing, the cured silicone layer preferably has a thickness of between 5 and 100 microns, with 5 to 50 microns being more preferred. In one preferred embodiment, the coating material is a two-part platinum, heat cure silicone resin with an uncured viscosity below 60,000 Cp, with a cured durometer (shore A) greater than 15, preferably greater than 80. More than one coating material may be applied over fiber 32 to achieve a composite or multi-layered membrane, with or without curing in between coats. Also, multiple coatings of the same material may be applied, with or without curing in between coats. Preferably, the silicone used to form the microtubes is of the type known to those of skill in the art as a solid membrane. That is, it is substantially nonporous and nonmicroporous.

Once the coating 21 has cured, the water-soluble PVA fiber 32 is removed by exposing the PVA to water or steam thus dissolving or melting the PVA, which can then be purged leaving behind the desired silicone hollow fiber 30 as shown in FIG. 2c. In one preferred embodiment, hot water is passed through the hollow first member 32 causing it to dissolve and be purged from the microtube 30. In embodiments where the inner fiber or member is solid, the member or fiber may be dissolved by exposing the assembly to steam and/or hot water. For example, steam may be used to additionally soften and/or dissolve the inner member, with water subsequently being used to further the dissolve and to flush the member out of the silicone tube.

Because pure silicone hollow fibers 30 are flimsy and difficult to handle, even after fully cured, it is preferred to leave the PVA fiber support within the silicone coating as in 32' until after the gas exchange device has been manufactured. The cured coated fiber 32' can be handled and wound into bundles using the same techniques that are used with current polypropylene microporous hollow fibers since the PVA is semi rigid much like the polypropylene. The microtubes, with the inner fiber or member as a support, are preferably potted using a potting centrifuge and a silicone resin as a potting material.

Referring to FIGS. 3a–3b, it is simple to dissolve and remove the PVA fiber 32 once the coated fibers 32' are firmly potted with potting material 35 (such as within a gas exchange device). This can be accomplished by flowing water within the lumen 20 of the PVA fibers 32 thus dissolving the PVA fibers 32 from the inside out. Note that when the fibers are potted, access to the PVA fibers' lumen 20 is obtained through the potted ends 36 and 37 where all fibers are manifolded. Thus, warm or hot water can be infused through one potted end 36 and purged through the other 37. As shown in FIG. 3b, once the PVA fibers 32 are dissolved and purged, the remaining silicone membrane hollow fibers 30 will remain-potted such that gas can flow though the lumens 33 of the hollow fibers 30, and blood can flow on the outside of the hollow fibers 30, or vice versa.

The first material fiber 32 can be configured as a hollow fiber (as in the example above) or as a solid fiber with any cross-section desired. Note that the shape of the first material fiber will dictate the shape of the inner lumen of the resulting hollow fiber. The first material in the above description was PVA but can be any material that can be subsequently removed or altered chemically, thermally, electrically, or mechanically; or that can be rendered porous by any method to allow fluid flow (or vacuum) through the lumen of the resulting hollow fiber.

The second material or coating material 21 can be any material that can be processed in such a way that will allow for depositing a layer of the second material over the first material fiber 32. The coating can be achieved by any suitable process such as, but not limited to extrusion and dipping. The second material may be selected such that the mass and heat transfer properties are suitable for the application where the resulting hollow fibers are used. For example, for a heat transfer application the coating material used may have a high heat-conducting coefficient. As one example, fluoropolymers may be used.

Figure 4:
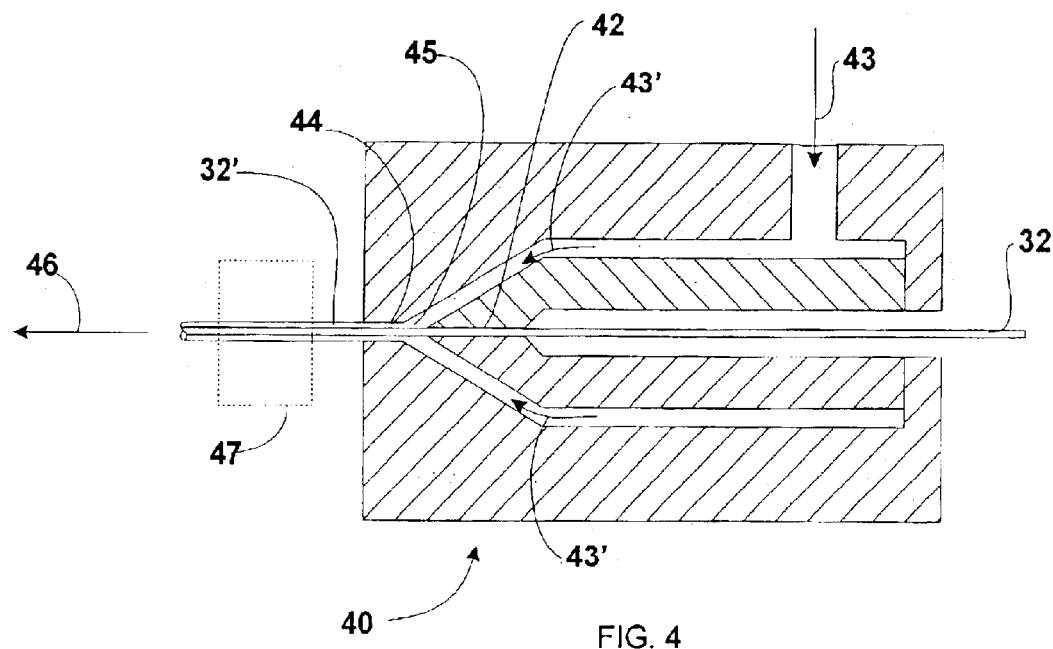
FIG. 4 is a cross-sectional view of one embodiment of a coating die for coating an elongated fiber according to the present invention.

One method of continuously coating the first material fiber 32 with a coating 21 of the second material is illustrated in FIG. 4. Referring to FIG. 4, the fiber 32 is coated using a coating die 40 (also called a centering crosshead die) of the kind commonly used for coating electric wire. The fiber 32 is threaded through the fiber guide 42 of the coating die 40, and the second material is injected into the die as designated by arrow 43 and flows toward the coating head 44 as designated by arrow 43' and coats the fiber 32 at 45. The coated fiber 32' is then pulled as designated by arrow 46 using commonly known extrusion takeoff equipment. The coated fiber may be heated, cooled, or processed as necessary at 47 between the coating die 40 and takeoff equipment to harden, cure, or render the coating material as needed.

Figure 5:
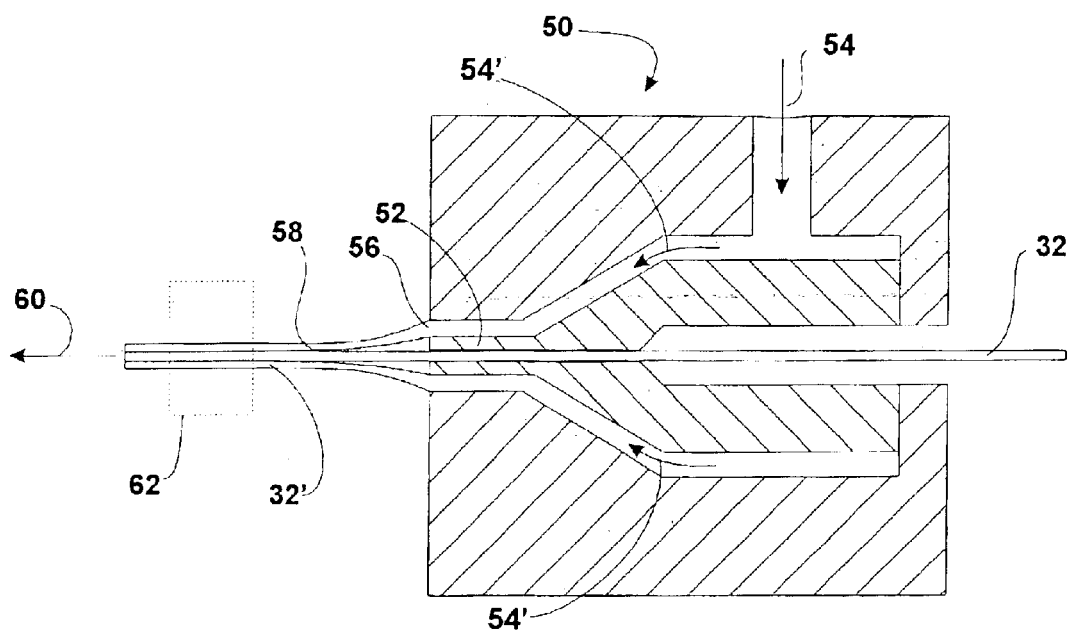
FIG. 5 is a cross-sectional view of a second embodiment of a coating die for use with the present invention.

Another method of continuously coating the first material fiber 32 with the second material coating 21 is illustrated in FIG. 5. Referring to FIG. 5, the first material fiber 32 is coated using a tubing die 50 similar to the kind commonly used for extruding tubing. A fiber of the first material 32 is threaded through the needle 52, and the coating material is injected into the tubing die 50 as designated by arrow 54 and flows toward the needle as designated by arrows 54' where it is extruded as tubing at 56, and then drawn-down onto, and coating the moving fiber 32 at 58. Coated fiber 32' is pulled as designated by arrow 60 using commonly known takeoff equipment. The coated fiber may be heated, cooled, or processed as necessary between the tubing die and takeoff equipment at 62 to harden, cure, or render the coating material as needed. Note that this method allows for draw down of the coating material as tubing before contacting fiber 32, thus allowing for a tubing die with a larger cross section compared to the cross section of the resulting fiber 30. Also, note that the fiber 32 need not fit tightly through the needle 52 to allow venting to the lumen of the extruded tubing, and to allow for small variations in fiber diameter 32.

Figure 6:
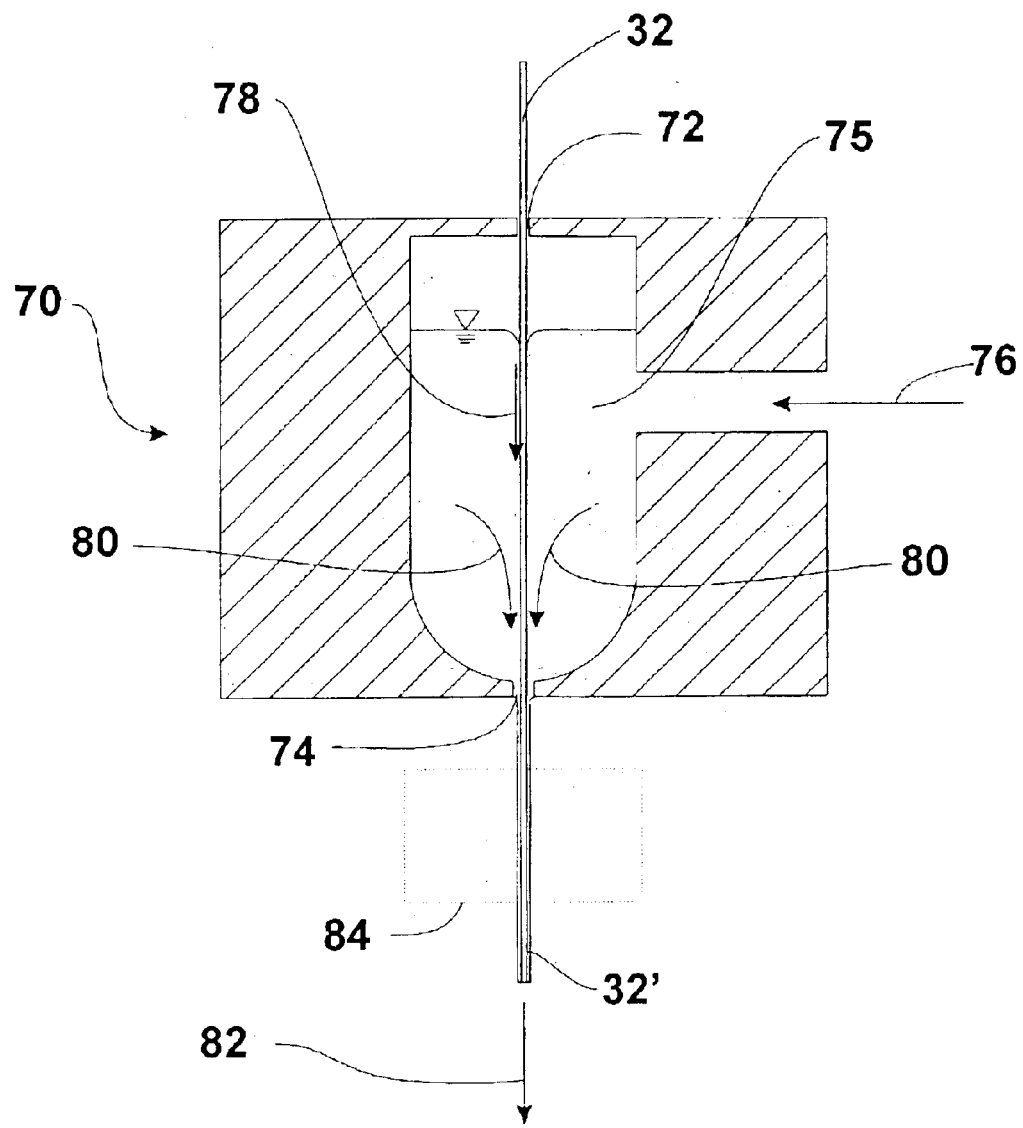
FIG. 6 is a cross-sectional view of a third embodiment of a coating die for use with the present invention.

Both methods presented above allow for additional stretching and draw down of the coated fiber 32' after it has been coated but before the coating material has hardened, cured or rendered as needed Yet, another method of continuously coating the first material fiber 32 with a second material coating 21 is illustrated in FIG. 6. This approach is well adapted to coating fiber 32 with low consistency liquid coating materials and is preferred for some embodiments of the present invention. Referring to FIG. 6, the first material fiber 32 is coated using a coating die 70. A fiber of the first material 32 is threaded through the die inlet orifice 72 and the die nozzle hole 74, and the coating material is continuously metered and injected into the die 70 as designated by arrow 76. As the fiber 32 is pulled through the die 70 in the direction indicated by arrow 78, the coating material 75 flows toward the nozzle 19 as indicated by arrows 80 as a result of viscous drag produced by the fiber 32 moving within the die 70.

The die 70 may be vented to atmosphere through orifice 72 thus minimizing the pressure on coating material 75, resulting in a substantially viscous driven flow (Couette flow) of coating material 75 through nozzle 74. Note that the rate of injection of coating material must equal the rate that coating material is applied to the fiber 32 at nozzle 74.

The coated fiber 32' is then pulled as designated by arrow 82 using commonly known extrusion takeoff equipment. The coated fiber may be heated, cooled, or processed as necessary at 84 between the coating die 17 and takeoff equipment to harden, cure, or render the coating material as needed.

The annular Couette flow pattern in nozzle 74 allows for sizing the nozzle hole larger than the final coating outer diameter of fiber 32'. In one preferred embodiment, the coating die 70 is vented to atmosphere with a die hole diameter estimated using an analytical solution to the Navier Stokes equations of Newtonian flow driven by viscous forces through the annular space between the die hole and the moving fiber. In one exemplary embodiment, a coating thickness of 25 microns is formed on a first fiber or member with an outside diameter of 250 microns, and the die hole has a diameter of approximately 354 microns.

Note that positive gas pressure or vacuum may also be applied to the die 70 through orifice 72 to achieve a combination of Couette and Poiseuille flow at nozzle 74 thus allowing for different hole sizes at nozzle 74 that produce the same coating outside diameter of coated fiber 32'. Also note that coating material 75 may be dispersed or dissolved in an appropriate solvent, such that subsequent processing at 84 evaporates or flashes-off the solvent resulting in a coating of reduced outside diameter on coated fiber 32 relative to undissolved coating material. This is a useful feature when very thin coatings are desired.

The fiber 32' may be stretched or drawn down prior to curing if desired to achieve smaller diameter coated fibers. Also, the multiple coatings may be applied sequentially before or after curing the previous coating.

While the above description constitutes the preferred embodiment of the present invention, it will be appreciated that the invention is susceptible to modification, variation, and change without departing from the principles of the present invention.

While the description above constitutes one embodiment of the present invention in the context of mass transfer across mass permeable membrane hollow fibers, it will be appreciated that the method of the present invention will find utility in numerous applications, including but not limited to energy transfer across membrane hollow fibers as well as any other context where hollow fibers are utilized.

I claim:

1. A method for forming a thin walled microtube, comprising the steps of
   providing a continuous elongated member having an outer surface, the member being at least partially formed of a water soluble material;
   providing a coating material, the coating material comprising a silicone compound, the compound being curable such that the coating material cures into a substantially non-porous silicone;
   coating the outer surface of the elongated member with the coating material so as to form a substantially uniform and continuous layer of coating material on the outer surface;
   curing the layer of coating material so as to form a substantially uniform and continuous layer of substantially non-porous silicone on the outer surface;
   at least partially dissolving the elongated member using water; and
   purging the at least partially dissolved member from the silicone layer;
   whereby an elongated microtube of substantially non-porous silicone is formed.

2. The method according to claim 1, wherein the continuous elongated member comprises a continuous thin walled tube.

3. The method according to claim 2, wherein the tube has a diameter in the range of 50 to 400 microns and a wall thickness in the range of 5 to 100 microns.

4. The method according to claim 3, wherein the cured layer of silicone has a thickness in the range of 5 to 100 microns.

5. The method according to claim 2, wherein the tube has a central passage therethrough and the dissolving step comprises passing hot water through the central passage.

6. The method according to claim 1, wherein the dissolving step comprises exposing the coated member to steam.

7. The method according to claim 1, wherein the elongated member has a central axis, the outer surface of the elongated member being cylindrical such that all portions of the outer surface are equidistant from the central axis.

8. The method according to claim 1, wherein the continuous elongated member is substantially completely formed from water-soluble polyvinyl alcohol.

9. The method according to claim 1, wherein the curing step comprises passing the coated elongated member through a heating device to heat cure the coating material.

10. The method according to claim 1, wherein the coating material is a first coating material, the method further comprising the step of coating the continuous elongated member with a second coating material prior to coating the continuous elongated member with the first material.

11. The method according to claim 1, wherein the coating material is a first coating material, the method further comprising the step of coating the continuous elongated member with a second coating material after coating the continuous elongated member with the first material.

12. The method according to claim 1, further comprising recoating the continuous elongated member with the coating material so as to form a second substantially uniform and continuous layer of coating material on the outer surface.

13. The method according to claim 1, wherein the coating step comprises providing a coating die and continuously passing the elongated member therethrough.

14. The method according to claim 1, further comprising:
collecting a plurality of the coated elongated members after the curing step and prior to the dissolving step;
grouping the collection of coated members into a bundle having a first end and a second end with a bundle body therebetween;
potting the first end of the bundle with a potting material so as to form a first potted end;
potting the second end of the bundle with a potting material so as to form a second potted end; and
cutting through the first and second potted ends such that the coated elongated members are cut and the elongated members are at least partially exposed.

15. A method for forming a thin walled microtube, comprising the steps of:
forming a continuous elongated member from a water soluble polyvinyl alcohol, the elongated member having a central axis and a cylindrical outer surface, the outer surface being uninterrupted with all portions of the outer surface being substantially equidistant from the central axis;
providing a coating material, the coating material comprising a silicone compound, the compound being curable such that the coating material cures into a substantially non-porous silicone;
providing a coating die having an orifice and a coating reservoir;
filling the coating reservoir with the coating material and continuously passing the elongated material through the orifice and the coating reservoir such that a substantially uniform layer of coating material is deposited on the outer surface of the elongated member, the layer forming an outer tube encasing the elongated member;
providing a curing device;
continuously passing the coated member through the curing device so as to cure the layer and form a substantially uniform and continuous tube of substantially non-porous silicone encasing the member;
exposing the elongated member to water so as to at least partially dissolve the elongated member; and
purging the at least partially dissolved member from the outer tube;
whereby an elongated microtube of substantially non-porous silicone is formed.

16. The method according to claim 15, wherein the continuous elongated member comprises a continuous thin walled tube.

17. The method according to claim 16, wherein the tube has a diameter in the range of 50 to 400 microns and a wall thickness in the range of 5 to 100 microns.

18. The method according to claim 17, wherein the cured layer of silicone has a thickness in the range of 5 to 100 microns.

19. The method according to claim 16, wherein the tube has a central passage therethrough and the dissolving step comprises passing hot water through the central passage.

20. The method according to claim 15, wherein the dissolving step comprises exposing the coated member to steam.

21. The method according to claim 15, wherein the curing device comprises a heater.

22. The method according to claim 15, wherein the coating material is a first coating material, the method further comprising the step of coating the continuous elongated member with a second coating material prior to coating the continuous elongated member with the first material.

23. The method according to claim 15, wherein the coating material is a first coating material, the method further comprising the step of coating the continuous elongated member with a second coating material after coating the continuous elongated member with the first material.

24. The method according to claim 15, further comprising recoating the continuous elongated member with the coating material so as to form a second substantially uniform and continuous layer of coating material on the outer surface.

25. A method of forming a portion of a gas exchange device having a plurality of thin walled microtubes, comprising the steps of:
forming a plurality of coated members, each coated member being formed by the steps of:
providing a continuous elongated member having an outer surface, the member being at least partially formed of a water soluble material;
providing a coating material, the coating material comprising a silicone compound, the compound being curable such that the coating material cures into a substantially nonporous silicone;
coating the outer surface of the elongated member with the coating material so as to form a substantially uniform and continuous layer of coating material on the outer surface;
curing the layer of coating material so as to form a substantially uniform and continuous layer of substantially non-porous silicone on the outer surface;
grouping the plurality of coated members into a bundle having a first end and a second end with a bundle body extending therebetween;
potting the first end of the bundle with a potting material so as to form a first potted end interconnecting and sealing the coated members to each other;
potting the second end of the bundle with a potting material so as to form a second potted end interconnecting and sealing the coated members to each other;
cutting off a portion of each of the first and second potted ends such that the coated members are cut and the elongated members are at least partially exposed;
at least partially dissolving the elongated members using water; and
purging the at least partially dissolved members from the silicone layers.

26. The method according to claim 25, wherein the continuous elongated members comprise a continuous thin walled tubes.

27. The method according to claim 26, wherein the tubes have a diameter in the range of 50 to 400 microns and a wall thickness in the range of 5 to 100 microns.

28. The method according to claim 27, wherein the cured layer of silicone on each of the members has a thickness in the range of 5 to 100 microns.

29. The method according to claim 26, wherein the tubes have a central passage therethrough and the dissolving step comprises passing hot water through the central passages.

30. The method according to claim 25, wherein the dissolving step comprises exposing the coated members to steam.

31. The method according to claim 25, wherein the elongated members each have a central axis, the outer surface of the elongated members each being cylindrical such that all portions of the outer surface are equidistant from the central axis.

32. The method according to claim 25, wherein the continuous elongated members are substantially completely formed from water soluble polyvinyl alcohol.

33. The method according to claim 25, wherein the curing step comprises passing each of the coated elongated members through a heating device to heat cure the coating material.

34. The method according to claim 25, wherein the coating material is a first coating material, the method further comprising the step of coating the continuous elongated member with a second coating material prior to coating the continuous elongated member with the first material.

35. The method according to claim 25, wherein the coating material is a first coating material, the method further comprising the step of coating the continuous elongated member with a second coating material after coating the continuous elongated member with the first material.

36. The method according to claim 25, further comprising recoating the continuous elongated member with the coating material so as to form a second substantially uniform and continuous layer of coating material on the outer surface.

37. The method according to claim 25, wherein the coating step comprises providing a coating die and continuously passing the elongated members therethrough.

38. A method for forming a thin walled microtube, comprising the steps of:
providing a continuous elongated member having an outer surface, the member being at least partially formed of a water soluble material;
providing a coating material, the coating material being curable such that the material becomes a solid;
coating the outer surface of the elongated member with the coating material so as to form a substantially uniform and continuous layer of coating material on the outer surface;
curing the layer of coating material so as to form a substantially uniform and continuous solid layer on the outer surface;
at least partially dissolving the elongated member using water; and
purging the at least partially dissolved member from the solid layer;
whereby an elongated tube of solid material is formed.

39. The method according to claim 38, wherein the coating material comprises a silicone compound, the compound being curable such that the coating material cures into a substantially non-porous silicone.

40. The method according to claim 38, wherein the continuous elongated member comprises a continuous thin walled tube.

41. The method according to claim 40, wherein the tube has a diameter in the range of 50 to 400 microns and a wall thickness in the range of 5 to 100 microns.

42. The method according to claim 41, wherein the cured layer of silicone has a thickness in the range of 5 to 100 microns.

43. The method according to claim 40, wherein the tube has a central passage therethrough and the dissolving step comprises passing hot water through the central passage.

44. The method according to claim 38, wherein the dissolving step comprises exposing the coated member to steam.

45. The method according to claim 38, wherein the elongated member has a central axis, the outer surface of the elongated member being cylindrical such that all portions of the outer surface are equidistant from the central axis.

46. The method according to claim 38, wherein the continuous elongated member is substantially completely formed from water soluble polyvinyl alcohol.

47. The method according to claim 38, wherein the curing step comprises passing the coated elongated member through a heating device to heat cure the coating material.

48. The method according to claim 38, wherein the coating material is a first coating material, the method further comprising the step of coating the continuous elongated member with a second coating material prior to coating the continuous elongated member with the first material.

49. The method according to claim 38, wherein the coating material is a first coating material, the method further comprising the step of coating the continuous elongated member with a second coating material after coating the continuous elongated member with the first material.

50. The method according to claim 38, further comprising recoating the continuous elongated member with the coating material so as to form a second substantially uniform and continuous layer of coating material on the outer surface.

51. The method according to claim 38, wherein the coating step comprises providing a coating die and continuously passing the elongated member therethrough.

* * * * *